Nov. 28, 1950  R. Q. BOYER  2,531,802
FILTER AND VALVE MECHANISM
Filed Nov. 30, 1944  3 Sheets-Sheet 1
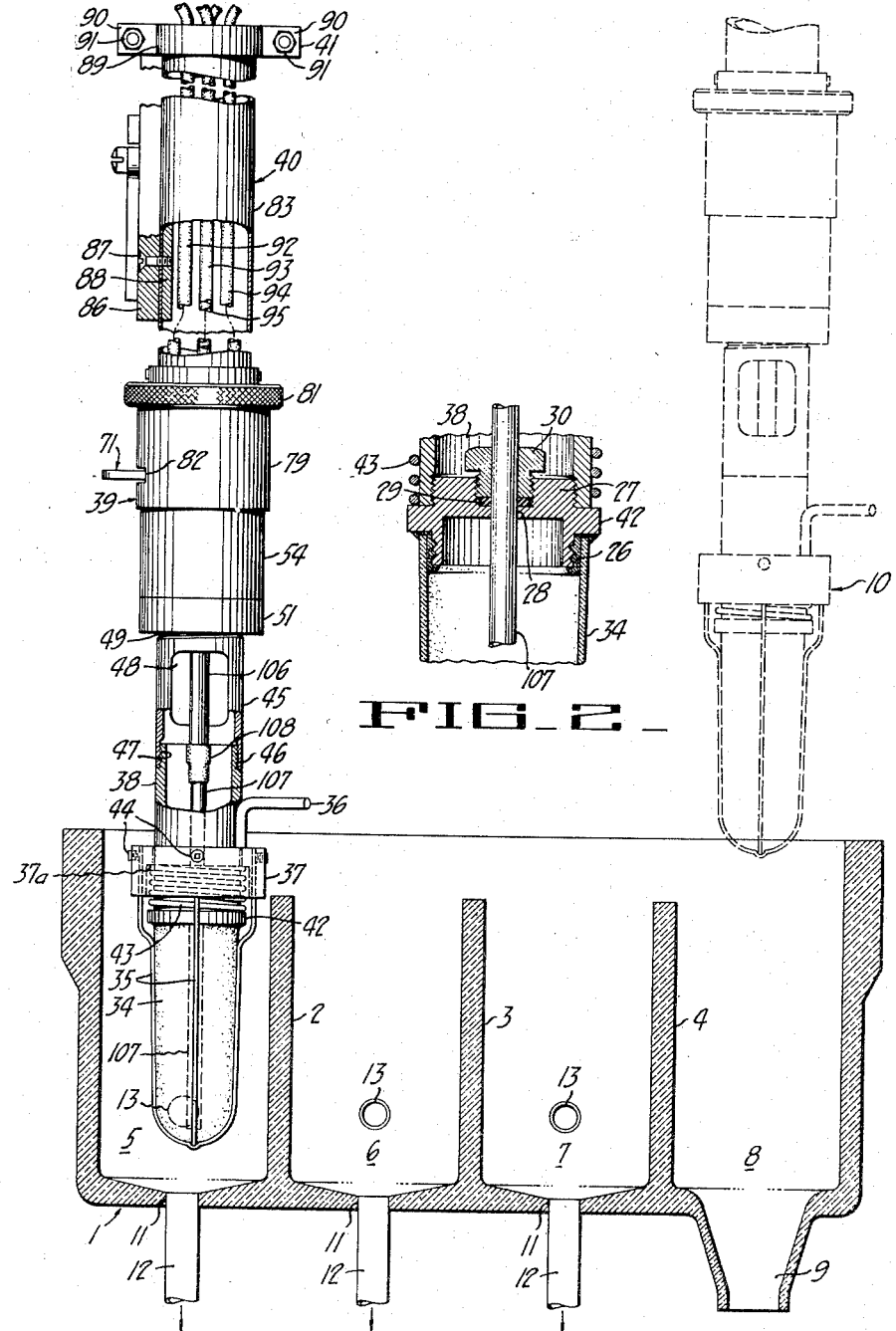
FIG_1_
FIG_2_
INVENTOR.
Robert Q. Boyer
BY
Robert A. Lavender

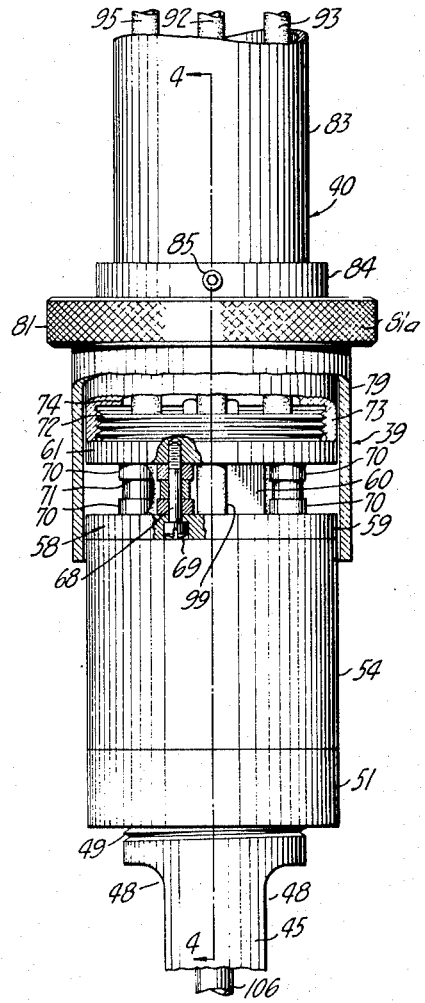
FIG_3_
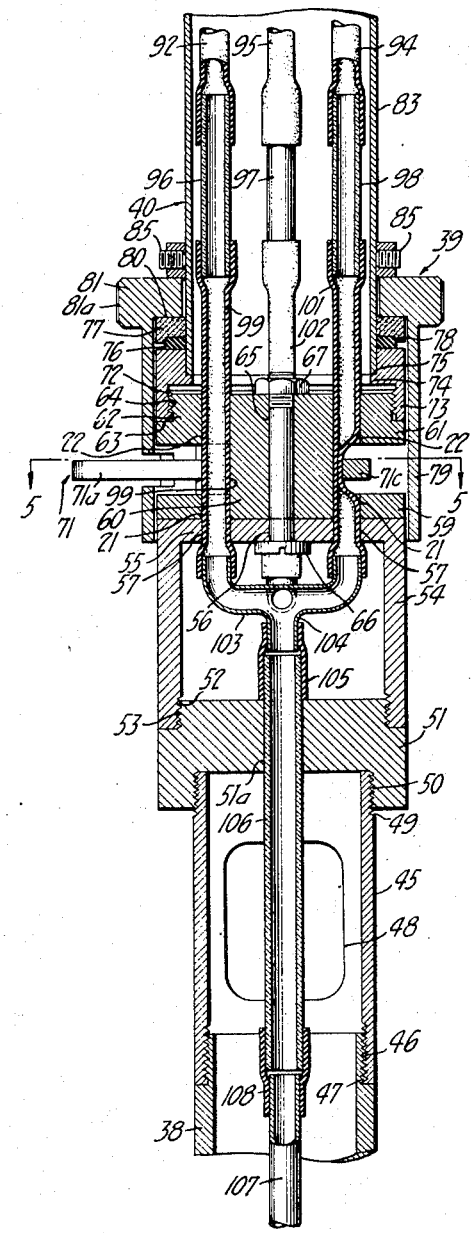
FIG_4_
INVENTOR.
Robert Q. Boyer
BY
Robert A. Lavender
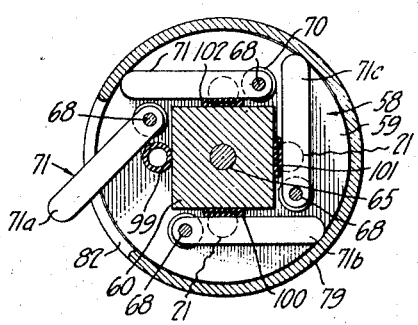
FIG_5_

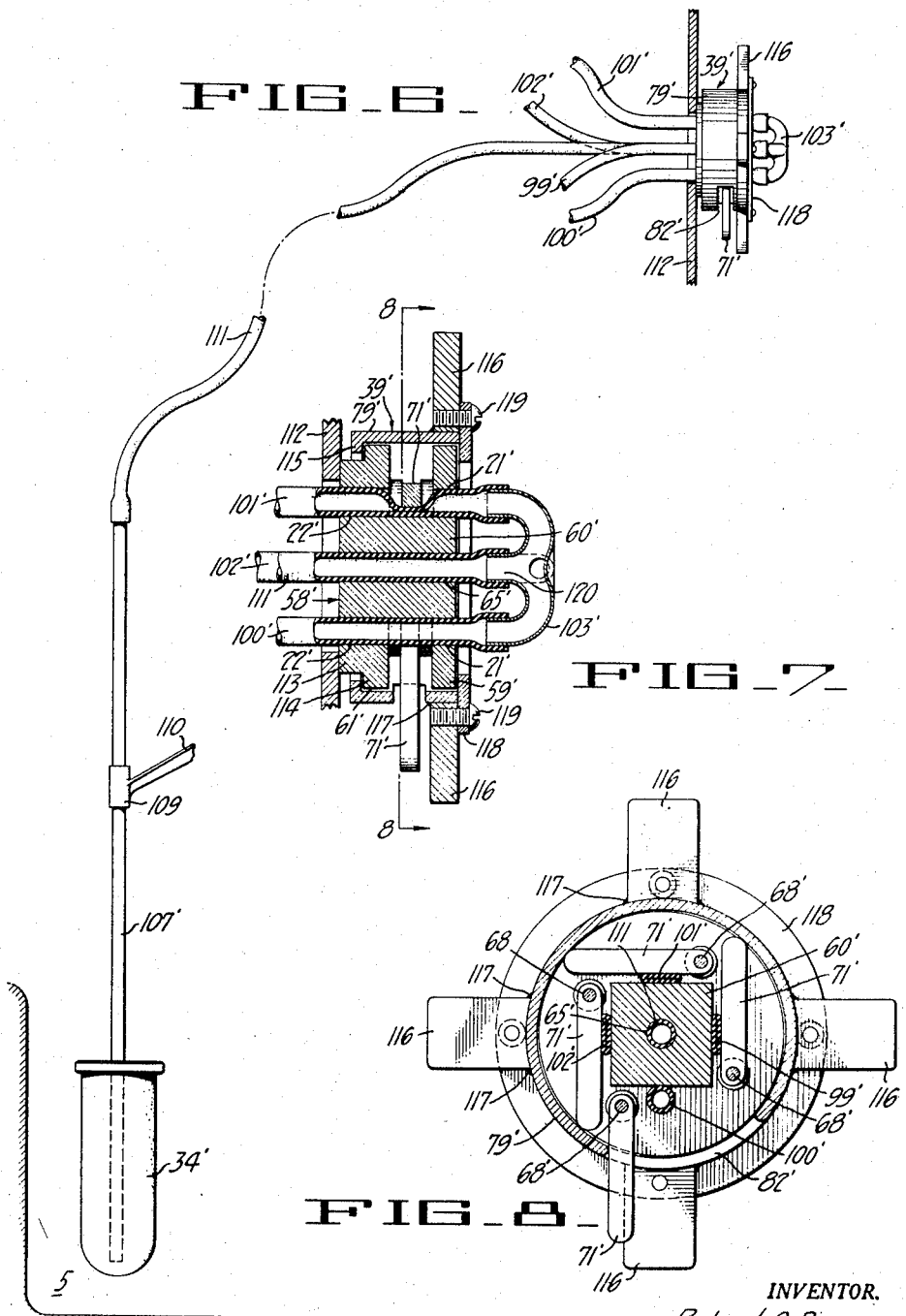

Patented Nov. 28, 1950

2,531,802

UNITED STATES PATENT OFFICE 2,531,802

FILTER AND VALVE MECHANISM

Robert Q. Boyer, Berkeley, Calif., assignor to the United States of America as represented by the United States Atomic Energy Commission Application November 30, 1944, Serial No. 566,002

16 Claims. (Cl. 210—150)

This invention relates to valve mechanisms and more particularly to a combination of valve and filter apparatus designed to handle extremely valuable precipitates substantially without loss.

In the copending application of Ross Cummings, Serial No. 571,421, filed January 5, 1945, there is described a process and apparatus for filtering a slurry to form a filter cake, washing the cake, drying the cake by means of a suitable volatile drying liquid, and removing the cake from the cake-forming filter which are particularly adapted for use with precipitates of extremely valuable material by reason of the substantial avoidance of any possible loss of precipitate in the process.

The present invention relates to the process disclosed in said copending application, and more particularly to an improvement in said process and apparatus wherein contamination of the slurry, wash liquor, or drying agent is substantially avoided by means of an improved valve mechanism associated with the apparatus.

The present invention includes, as an important part thereof, an improved valve mechanism for selectively opening any one of a plurality of lines while assuring complete closure of the remainder of the lines.

It is accordingly one object of this invention to provide an improved apparatus for filtering, washing, drying, and recovering precipitate which prevents contamination of the associated slurry, wash liquor, and drying liquid.

It is a further object of this invention to provide apparatus for carrying out such filtering, washing, drying, and recovering process which is particularly adapted for use with precipitates of extremely valuable material.

It is a further object of this invention to provide a valve mechanism for selectively opening to a single conduit any one of the slurry, wash liquor, or drying liquid withdrawal lines of the combined apparatus disclosed, while positively preventing leakage to or from the other of such lines.

It is a further object of this invention to provide a valve mechanism of the type described which can be mounted either on a control panel, in the filter column or otherwise in the system, as desired.

It is a further object of this invention to provide a valve mechanism for use in the processes having a fluid pressure differential in the lines to be controlled in which the reduced pressure on one side of the valve aids in maintaining secure closure of the valves.

It is another object of this invention to provide a valve mechanism of the type described especially adapted for use in the filter process disclosed and which is simple and economical to construct and easy to operate.

In general, the filter process of this invention involves the use of a series of tanks in a horizontal alignment and respectively containing a slurry to be filtered, a wash liquor, a suitable drying fluid, and a filter cake-receiving chamber. Each of the tanks in order is adapted to receive one or more thimble filters, which are employed to pick up the precipitate from the slurry in the first tank and to carry the resulting filter cake to the succeeding tanks in sequence for washing and drying the filter cake and removing it from the filter. The thimble filters are manipulated in accordance with this series of operations by means of apparatus adapted to support each thimble filter independently as more completely disclosed in the above-mentioned copending application of Ross Cummings. The apparatus includes a filtering column having a thimble filter attached to the lower end thereof. The filter column includes a filter head for holding the thimble filter, a lower tubular assembly for supporting the filter head, a suction-controlled valve unit supporting the lower tube assembly and an upper tubular assembly supporting a valve unit and housing a plurality of suction tubes selectively operable by the valve unit to apply suction to the thimble filter. Each filtering column is supported for independent horizontal movement along the line of the several tanks and for vertical movement over each of the tanks to lower the associated thimble filter into and out of each tank in order.

In the accompanying drawings:

Figure 1 is an elevation, partly in section, of a preferred embodiment showing the valve, tank, and filter mechanism of this invention.

Figure 2 is an enlarged fragmentary vertical section showing the vacuum seal employed in the filter column.

Figure 3 is an enlarged elevation, partly broken away and in section, of the valve mechanism shown in Figure 1.

Figure 4 is a section on the line 4—4 of Figure 3.

Figure 5 is a section on the line 5—5 of Figure 4.

Figure 6 is a fragmentary elevation of an alternative embodiment of this invention showing the valve mechanism installed upon a panel.

Figure 7 is an enlarged vertical section of the valve mechanism shown in Figure 6.

Figure 8 is a section on the line 8—8 of Figure 7.

Referring more particularly to the drawings in the embodiment illustrated in Figures 1 to 5 there is illustrated a precipitate-recovery apparatus including a receptacle generally designated 1 made of any suitable non-porous material chemically resistant to the solutions to be contained therein, divided by partitions 2, 3 and 4 into four tanks or compartments 5, 6, 7, and 8. Tanks 5, 6, and 7 are adapted to contain a slurry to be filtered, a suitable wash solution, and a suitable volatile anhydrous organic solvent, respectively. Tank 8 is adapted for housing the thimble filter during the scraping operation as hereinafter more particularly described. The bottoms of each of the tanks 5, 6, and 7 are sloped toward outlet openings 11, to which are connected outlet pipes 12 which may be provided with suitable valves (not shown). Each of the tanks 5, 6, and 7 is also provided with an opening 13 communicating with a pipe, not shown, for supplying to that tank the slurry, the wash solution, or the organic solvent to be contained therein. The tank 8 is provided with an outlet 9 through which the material removed in the scraping operation may fall into any suitable container (not shown).

The tank 1 and its associated apparatus described above is adapted to accommodate one or more thimble filters 34. The thimble 34 may be formed of any suitable material. In the accompanying drawings there is illustrated a single thimble filter 34. However, if desired a plurality of such thimble filters may be employed. The thimble filter 34 is adapted to be dipped into the tank 5 containing the slurry to be filtered and to have suction applied to the inside of the thimble to draw filtrate through the porous walls and to cause a filter cake to build up on the outside of the thimble. The thimble filter is then adapted to be lifted vertically out of the tank 5, moved horizontally over the tank 6, and lowered vertically into the wash solution in the tank 6. In this position suction is again applied to the inside of the thimble to draw wash solution through the filter cake to the inside of the thimble, thus displacing residual filtrate held by the filtrate cake. The thimble filter is then raised vertically out of the tank 6, moved horizontally to a position above the tank 7 and lowered into a suitable volatile organic solvent contained in the tank 7. Suction is again applied to the inside of the thimble to draw the organic solvent through the filter cake into the inside of the thimble, displacing residual wash solution held by the filter cake. The thimble filter is then again raised vertically out of the tank 7 with suction still applied to the inside of the thimbles, whereby air is drawn through the filter cake, causing the volatile solvent to evaporate, thus leaving the filter cake in a dry condition. The thimble filter is next moved horizontally to the position indicated generally, in broken lines, at 10 in Figure 1 and then lowered into tank 8. The thimble filter 34 carries a plurality of scraper blades 35 mounted thereon adapted to be rotated by means of the handle 36 securely affixed to the scraper hub 37. By rotating the scraper blades 35 through approximately a quarter of a turn, the filter cake is removed from the thimble and falls into the tank 8, through the outlet opening 9 and into any suitable collector, not shown.

The filter column illustrated in Figures 1 to 4 includes as principal elements the thimble filter 34, the scraper blades 35, a filter head 38 supporting the thimble filter, a selective valve unit indicated generally as 39, an upper tubular assembly 40 supporting the valve unit, and a bracket 41 supporting the entire filter column. The filter thus described is adapted for use with the rail mechanism for controlling horizontal movement and also for a vertical movement into and out of the tanks 5, 6, 7, and 8 as more fully described in the aforementioned copending application.

As shown in Figures 1 and 2, the filter head 38 is threadedly connected to a fitting 42 onto which the upper rim of the thimble filter 34 may be fitted and cemented, by the use of a suitable ceramic cement 26. The fitting 42 has an inwardly extending portion 27 apertured at 28 for the passage of the tube 107. The portion 27 is bored out for a portion of its length and internally threaded for the reception of a packing gland 30. A packing member 29 is retained in the bore by the gland 30.

The scraper blades 35 are fixedly connected by any suitable means such as the set screws 44 to the scraper hub 37 and a compression spring 43 having its lower end abutting upon the fitting 42 is positioned about the filter head 38 and retained under a slight compression by the shoulder 37a within the scraper hub 37. For scraping the filter cake from the filter, a handle 36 securely affixed to the ring 37 is provided for rotation of the blades 35 which are urged into intimate contact with the outer surface of the thimble filter 34 by the compression spring 43.

As best shown in Figure 4, a nipple 45, internally threaded as at 46 for connection with the external threads 47 on the upper end of the filter head 38 and having viewing apertures or windows 48 is positioned in the filter column and permits the operator to detect visually the presence of any solid mater in the line 106.

The nipple 45 is externally threaded as at 49 for threaded connection with internal threads 50 of valve head 51. The valve head 51 has a central aperture 51a and forms the lower member of the valve unit 39. The valve unit 39 comprises a four-way pinch valve adapted to open selectively one only of four associated tubes. Positioned above the valve head 51 and threadedly connected thereto by external threads 52 mating with internal threads 53 is a cylinder 54. The cylinder 54 is closed at its upper end by an end wall 55 having a central aperture 56 and four radially disposed apertures 57 symmetrically arranged near its periphery.

A mandrel 58 is provided having a lower disk-like portion 59, an intermediate block 60 having a regular polygonal, horizontal cross-section, shown here in the shape of a square, and an upper disk member 61 having a reduced portion 62 forming a shoulder 63. The reduced portion 62 is externally threaded as at 64.

The mandrel 58 has a central aperture or bore 65 registering with the aperture 56 in the end wall 55 and a bolt 66 is positioned in these apertures and removably secured by a nut 67, thus removably attaching the end wall 55 to the mandrel.

The disk member 59 and the disk member 61 have four radially disposed apertures 21 and 22, respectively, registering with the apertures 57 in the end wall 55 and having their axes parallel to and spaced slightly from the flat side walls of the block 60.

As shown in Figure 3, a series of four pivot pins 68 is mounted between the disk 61 and the disk 59 in the space opposite the flat sides of the block 60. These pins 68 are provided with heads 69 counter-sunk in the disk 59 and threaded into internal threads in the disk 61. The pins 68 also carry a pair of spacers 70. As more clearly illustrated in Figure 5 the pins 68 are positioned adjacent the four corners of the block 60 and slightly spaced away from the flat sides thereof. Each of the pins 68 carries an associated pinch lever 71 for a purpose hereinafter described.

Disposed above the mandrel 58 and threadedly connected thereto by the internal threads 72 mating with the external threads 64 is an irregular collar member 73 having a reduced portion 74, the bore of which is enlarged for a portion only of its length to form an internal shoulder 75.

A gasket 76 is disposed immediately above the collar 73 and a washer 77 having a gasket-retaining shoulder 78 is provided in engagement with the gasket 76.

A valve operating sleeve 79 is disposed about the washer 77, collar 73, mandrel 58, and upper end wall 55 of cylinder 54 as shown. The sleeve 79 has an inwardly turned shoulder 80 engaging the upper surface of the washer 77 and may be provided with a flange 81, having a knurled surface 81—a.

As clearly illustrated in Figure 5, the sleeve 79 has an arcuate slot 82 communicating with the space formed by the mandrel 58 and positioned in the same plane as the pinch levers 71. The sleeve 79 is mounted for rotation on the washer 77.

The upper tubular assembly 40 supporting the valve unit includes a tubular housing 83, the lower end of which abuts upon and is secured to, as by welding or by any other suitable means, the shoulder 75 of the collar 73. A retaining ring 84, having a plurality of set screws 85, is mounted upon the housing 83 and with the set screws 85 firmly set, serves to retain the sleeve 79 in position upon the valve unit.

Referring now to Figure 1, the tubular housing 83 is shown to carry a rib 86 of rectangular cross-section running longitudinally of the housing 83 and is secured thereto by counter-sunk screws 87 threaded into a backing strip 88 positioned parallel to the rib 86 and within the housing 83.

The bracket 41 is formed of a split collar 89 having flanges 90 bolted together by bolts 91 to clamp the collar to the housing 83. Both the rib 86 and the collar 89 adapt the column for use in the type of supporting and translating mechanism shown in detail in the above-mentioned copending application.

Four tubes numbered 92, 93, 94, and 95, respectively, are housed within the house 83. These tubes are preferably of rubber or other flexible material chemically resistant to the materials employed in the filter process. Just above the lower end of the housing 83, Figure 4, there are shown lengths of glass or other tubing material 96, 97, and 98 connected to each of the rubber tubes 92, 95, and 94, respectively. A similar length of tubing (not shown) is connected to the rubber tube 93. These lengths of tubing are provided in order to permit disconnection of the housing 83 from the valve unit without necessitating removal of the tubes contained within the valve unit itself. Below the lengths of tubing just described are connected lengths of rubber or other resilient tubing 99, 100, 101, and 102 which pass adjacent the flat sides of the block 60 of the mandrel 58, through the holes 21 and 22 in the disks 59 and 61, respectively, and through the apertures 57 in the end wall 55 of the cylinder 54.

A manifold 103 having a port for each of the tubes 99, 100, 101, and 102 on one side thereof and a single port 104 on the other side thereof is attached to the tubes as shown. By means of a short length 105 of rubber or other flexible tubing, a section of glass or otherwise transparent tubing 106 is attached to the port 104. The length 106 of transparent tubing passes through the central aperture 51a in the valve unit 51 and is thus positioned in a manner to be viewed through the windows 48. Below the windows 48 a tube 107 of stainless steel or other suitable material is attached to the transparent tube 106 by means of another short length of flexible tubing 108. The tube 107 terminates adjacent the bottom of the thimble filter 34.

The valve unit 39 is adapted to open selectively any one of the lines 99, 100, 101, or 102 while keeping the others securely closed. It suffices simply to rotate the sleeve 79 in a counter-clockwise direction (as viewed in Figure 5), thus causing the pinch lever 71a, by engagement with the inner surface of the sleeve 79, to assume a position parallel to the straight side of the block 60. In this position, the tube 99 will be flattened and securely closed, while, by virtue of the movement of the arcuate slot 82 into a position freeing the pinch lever 71b, that lever will spring outward under the force of the resilient tube 100, thus opening that tube. Further counter-clockwise rotation of the sleeve 79 will close the lever 71b and open the lever 71c, while still further rotation will close the lever 71c and open the next pinch lever.

While there is illustrated an arrangement employing a block 60 having a square cross-section and four tubes 99, 100, 101, and 102 are shown, it will be apparent that a block 60 having a cross-section in the shape of any form of a regular polygon may be used and any number of associated tubes may be employed, as desired. For example, a cross-section in the shape of an equilateral pentagon may be employed and, consequently, five flexible tubes or a hexagon may be employed with six tubes.

The pinch levers 71 are especially effective in achieving a secure closure of the associated tubes, inasmuch as the filter process employs suction means (not shown) connected to the tubes and the reduced pressure on the upper side of the filter column tends to assist in drawing together the walls of the tubes and thus to assure a tight closure.

In Figures 6, 7, and 8 there is shown an alternative embodiment of this invention employing a similar thimble filter 34', shown positioned in the tank 5. The tube 107' carries a sleeve 109 having a suitable manipulating lever 110 attached thereto. A length of flexible tube 111 is connected to the tube 107'. The valve unit 39' is shown mounted upon a panel 112.

The valve unit 39' includes a mandrel 58', generally similar to the mandrel 58 above described and formed of a disk 59', a central block 60' having a square cross-section, and a disk member 61' having a reduced portion 113 forming a shoulder 114. The mandrel 58' is provided with a central aperture 65'.

Four pivot pins 68' similar to the pins 68 support four pinch levers 71' in the same manner as above described. A sleeve member 79' having an inwardly turned flange 115 surrounds the mandrel 58, the flange 115 engaging the shoulder 114. An arcuate slot 82' is formed in the sleeve 79'. The disk 61' is provided with four equally spaced holes 22' registering with similar holes 21' in the disk 59'. Four outwardly extending spokes 116 are provided, welded as at 117 to the sleeve 79' and a hub 118 is secured, as by screws 119, to the spokes 116. The hub 118 extends inwardly beyond the outer edge of the disk 59' and thus with the shoulder 115 serves to retain the sleeve 79' upon the mandrel 58'.

Tube 111 passes through the central aperture 65' of the mandrel 58' and is connected to one port 120 of the manifold 103'. The manifold 103' is also provided with four ports adapted for connection with the four flexible tubes 99', 100', 101', and 102'. As shown, the manifold 103' has the port 120 formed on the same side and leading in the same direction as are the four ports connecting with the tubes 99', 100', 101', and 102'. These tubes pass directly from the manifold through the holes 21' in the disk 59', then closely adjacent the flat sides of the block 60' and thence outwardly through the holes 22' in the disk 61' as shown.

In both embodiments of the innvention illustrated, the tubes 92, 93, 94, and 95 in the first embodiment and the tubes 99', 100', 101', and 102' in the second embodiment may be connected to appropriately associated pumps (not shown), whereby suction may be applied to these lines, and the pumps may lead in turn to appropriate receptacles (not shown) for the slurry, wash liquor, and drying fluid.

The operation of the above described filter column is as follows: The tank 5 having been filled, through the opening 13, with a slurry to be filtered one or more filter columns are lowered into the tank until the thimble filter 34 is substantially submerged. The sleeve 79 (79' in Figures 6 to 8) is then rotated until one of the levers, e. g., 71a, is free, thus opening the tube 99. Suction is applied to the tube 92 and communicated by the tube 99 and the manifold 103 to the tube 107 causing a filter cake to biuld up upon the outer surface of the thimble filter 34. The filter column is then raised out of the tank 5 and transferred to the tank 6 which has meanwhile received a charge of wash liquor. The sleeve 79 is meanwhile rotated sufficiently to close pinch lever 71a and tube 99 and open pinch lever 71b and tube 100.

In some cases, it may be desired to reslurry the filter cake in the tank 6 in which case the tube 93 communicating with the tube 100 may be attached to a source of air pressure which may be used to blow off the filter cake and to agitate the wash liquor, thus completely reslurrying the precipitate. The sleeve 79 may then be given another slight turn sufficient to close the pinch lever 71b and the tube 100 and to open the pinch lever 71c and the tube 101. The tube 101, through tube 94, is also attached to a suitable suction pump, thus again building up on the filter 34 a filter cake and simultaneously washing the cake free of any entrained filtrate. Obviously, however, the reslurrying step sometimes may be omitted, in which case the tube 100 and the connected tube 93 may also be connected with a suction pump to merely wash the cake, rather than a source of air pressure, for reslurrying.

When the filter cake is again built up, and when it has been sufficiently washed in the tank 6 the filter column is raised out of the tank 6 and transferred to the tank 7. Tank 7 has, meanwhile, received a charge of an organic anhydrous volatile drying liquid. The sleeve 79 is again rotated sufficiently to close pinch lever 71c and the tube 101 and to open the next pinch lever and the tube 102. Tube 102 through tube 95 is also connected with a suction pump, thus drawing the drying liquid through the filter cake. Next the filter column is raised out of the tank 7 and the tubes 102 and 95 are left open. Due to the volatile nature of the drying liquid all of the liquid is drawn off in vapor form from the filter cake which is thus completely dried. The filter column is then transferred to the tank 8, the scraper blades 35 are rotated by means of the handle 36, and the filter cake scraped from the filter 34. The removed filter cake falls into the tank 8 and discharges through outlet 9 to its collector.

During the above described steps, the operator may at all times observe the various liquids in the tube 106 through the windows 48 and thus check them for clarity to determine whether or not the filter process is functioning correctly.

The carrying out of the filter process using the embodiment illustrated in Figures 6, 7, and 8 is essentially the same, differing only in the fact that the valve unit 39' is located at a central panel 112, which is desirable in the cases where a plurality of units are operated as a bank.

As more fully set forth in the above mentioned copending application of Ross Cummings, the general arrangement of filter column set forth is particularly advantageous for the handling of extremely valuable precipitates. Inasmuch as the entire process is carried out within the limits of the receptacle 1 and as all of the filtrates, wash liquors, and drying liquids may be recovered and recycled, loss of precipitate is absolutely minimized. Furthermore, the pinch valve structure of the present invention positively prevents any contamination of the various liquids by leakage back down the tube 107. It will be appreciated, however, that while the valve structure disclosed is particularly useful in the filter process described, obviously it is of general utility and may be employed to advantage in any case where it is desired to open selectively one only of a plurality of such lines.

While there has been described what are at present considered preferred embodiments of the invention, it will be understood that various modifications may be made therein. It is intended to cover in the appended claims, therefore, all such modifications as fall within the true scope and spirit of the invention and the invention accordingly is not to be considered as limited to the exact details shown, except as it may be so defined in the following claims.

What is claimed is:

1. A multiple port valve comprising a central body member, a plurality of flexible tubes carried by said member, a sleeve element surrounding said member and mounted for movement with respect thereto, and pinch mechanism carried by said member and engageable by said element for simultaneously releasably pinching a plurality of said tubes into closed position against said body member while leaving one tube open, said pinch mechanism comprising a plurality of spaced pinch members, each pinch member being adapted to cooperate with a single tube, and said sleeve element having means for releasing said pinch members from pinching relation with said tubes seriatim and one at a time.

2. A multiple port valve as recited in claim 1, wherein said pinch mechanism comprises a plurality of pivoted pinch levers, the free end of each lever extending into the path of movement of said movable sleeve element.

3. A multiple port valve as recited in claim 1, wherein said sleeve element is rotatable about said central body member.

4. A multiple port valve as recited in claim 1, wherein said sleeve element is rotatable about said central body member and is provided with an aperture through which a selected portion of the pinch mechanism is adapted to project.

5. A multiple port valve comprising a central anvil member, a plurality of flexible tubes passing adjacent said anvil member, a movable sleeve member surrounding said anvil member and tubes and having an aperture therein, a plurality of pinch levers respectively mounted adjacent each of said tubes and extending into the path of movement of the aperture in said sleeve member, and each lever serving in one position to pinch its associated tube against said anvil member to close said tube, said sleeve member serving to retain all but one of said pinch levers releasably in said position while permitting one of said levers to open through said aperture and being rotatable to permit selective opening of individual tubes.

6. A multiple port valve as recited in claim 5, wherein said levers are pivotally mounted on said anvil member as a fulcrum adjacent their inner ends.

7. A multiple port valve as recited in claim 5, wherein said anvil member comprises a regular polygonal cross section and said flexible tubes are disposed respectively adjacent a flat side of said anvil member.

8. A valve mechanism comprising a centrally disposed element, a plurality of levers disposed about said element and pivotally mounted thereon, a corresponding plurality of flexible conduits disposed about said element and respectively positioned between said levers and said element, each one of said levers being movable about its pivot toward said element to deform from its normal configuration the corresponding one of said flexible conduits in order to decrease the effective opening therethrough and movable about its pivot away from said element to permit said one flexible conduit to resume its normal configuration in order to increase the effective opening therethrough, and lever-actuating means surrounding said element and conduits and including a collar rotatably mounted on said element for selecting any one of said levers to permit its movement away from said element while retaining the remainder of said levers in maximum tube deforming position, said collar contacting the outer ends of said levers in said conduits deforming position thereof.

9. Filtering apparatus comprising a hollow, porous filter element open at one end, a non-porous closure therefor, a multiple port valve unit having a central anvil member, a first conduit passing through said closure and communicating at one end with the interior of said hollow filter element and at its opposite end with a port of said valve unit, a plurality of additional conduits each communicating with one of a corresponding number of additional ports of said valve unit, said additional conduits each having flexible portions positioned adjacent said anvil member, a plurality of pinch levers respectively associated with said flexible portions, each of said pinch levers being adapted in closed position to pinch its associated flexible portion against said anvil member, and a movable sleeve member surrounding said anvil member and flexible portions of the conduits adjacent thereto and contacting one end of said pinch levers, said sleeve member and levers actuated thereby being operable selectively to place said additional conduits individually into communication with said first conduit.

10. Apparatus as recited in claim 9, wherein said movable sleeve member is provided with an aperture into which a selected one of said pinch levers projects while the flexible conduit associated with the selected pinch lever remains in communication with said first conduit.

11. Apparatus as recited in claim 9, wherein each of said additional conduits is connected to an exhaust means.

12. A filter column comprising a thimble filter, an exhaust tube within said thimble filter, a tubular housing member supporting said filter, a manifold connected with said exhaust tube, a plurality of flexible tubes mounted within said tubular housing member and communicating with said manifold, a selective valve connected to said tubular housing and having an anvil member, a plurality of pinch levers, and a movable apertured sleeve member surrounding said anvil member and adapted to selectively force all but one of said pinch levers against all but one of said flexible tubes to pinch said tubes against said anvil member and close said tubes, and exhaust means connected to said flexible tubes whereby material exhausted through said filter is passed to a selected flexible tube.

13. A filter column comprising a thimble filter, an exhaust tube within said thimble filter, a tubular housing member supporting said filter, a manifold connected with said exhaust tube, a plurality of flexible tubes mounted within said tubular housing member and communicating with said manifold and a selective valve connected to said housing member and having an anvil member, a plurality of pinch levers and a movable, apertured sleeve member surrounding said anvil member and adapted selectively to force all but one of said pinch levers against said all but one of flexible tubes to pinch said tubes against said anvil member and close said tubes, and exhaust means connected to said flexible tubes whereby material exhausted through said filter is passed to a selected flexible tube, and said sleeve member being mounted on said anvil member for rotation to change the flexible tube so selected.

14. Filtering apparatus comprising a tubular member, a filtering element carried on the lower end of said tubular member, a centrally disposed element carried by the tubular member intermediate its ends, a plurality of levers disposed about said element and pivotally mounted thereon, a corresponding plurality of conduits carried by said tubular member and having flexible portions disposed about said element and communicating with the interior of the filtering element, the flexible portions being respectively positioned between said levers and said element, each one of said levers being movable about its pivot toward said element to deform from its normal configuration the corresponding one of said flexible portions in order to decrease the effective opening therethrough and movable about its pivot away from said element to permit said one flexible portion to resume its normal configuration in order to increase the effective opening therethrough, and lever-actuating means surrounding said centrally disposed element and conduits and including a collar rotatably mounted on said tubular member for selecting any one of said levers to permit its movement away from said element while retaining the remainder of said levers in maximum tube deforming position, said collar contacting the outer ends of said levers in said tube deforming position thereof.

15. Filtering apparatus comprising a hollow, porous filter element open at one end, a non-porous closure therefor, a conduit passing through said closure and communicating at one end with the interior of said hollow filter element and having its opposite end leading to a remote control panel, a plurality of flexible tubes located in said panel, a manifold connecting each of said tubes to said conduit, an anvil member, a corresponding plurality of pinch levers associated with said tubes, each of said pinch levers being adapted in closed position to pinch its associated tube against said anvil member, and lever-actuating means surrounding said anvil member and tubes and movable relative to said anvil member to permit selective opening of one of said pinch levers while retaining the remainder of said pinch levers in closed position, said lever-actuating means contacting the outer ends of each lever in the closed position of said levers.

16. Filtering apparatus comprising a hollow, porous filter element open at one end, a non-porous closure therefor, a conduit passing through said closure and communicating at one end with the interior of said hollow filter element and having its opposite end leading to a remote control panel, a plurality of flexible tubes located in said panel, a manifold connecting each of said tubes to said conduit, an anvil member, a corresponding plurality of pinch levers associated with said tubes, each of said pinch levers being adapted in closed position to pinch its associated tube against said anvil member, lever-actuating means surrounding said anvil member and tubes and movable relative to said anvil member to permit selective opening of one of said pinch levers while retaining the remainder of said pinch levers in closed position, said lever-actuating means contacting the outer end of each lever in the closed position of said levers, and exhaust means connected to said flexible tubes whereby material exhausted through said filter is passed to a selected flexible tube.

ROBERT Q. BOYER.

REFERENCES CITED

The following references are of record in the file of this patent:

UNITED STATES PATENTS

| Number | Name | Date |
|---|---|---|
| 743,652 | Moore | Nov. 10, 1903 |
| 887,268 | Porter et al. | May 12, 1908 |
| 945,193 | Ridgway | Jan. 4, 1910 |
| 1,338,782 | Lindahl | May 4, 1920 |
| 1,605,652 | Dotterweich | Nov. 2, 1926 |
| 2,129,055 | Gibbs | Sept. 6, 1938 |
| 2,197,995 | Crowley | Apr. 23, 1940 |
| 2,212,733 | Grigsby | Aug. 27, 1940 |